United States Patent [19]

Wilhelm

[11] Patent Number: 4,926,025
[45] Date of Patent: May 15, 1990

[54] ELECTRICALLY HEATED SEAT RESISTIVE HEATING ELEMENT ENERGIZATION SYSTEM

[75] Inventor: Daniel D. Wilhelm, Reed City, Mich.

[73] Assignee: Nartron Corporation, Reed City, Mich.

[21] Appl. No.: 319,922

[22] Filed: Mar. 6, 1989

[51] Int. Cl.$^5$ ............................................. H05B 1/02
[52] U.S. Cl. ................................... 219/202; 219/506; 219/501; 219/505
[58] Field of Search ............... 219/202, 203, 490, 494, 219/497, 499, 501, 505, 507, 508, 509, 506; 337/113; 307/117

[56] References Cited

U.S. PATENT DOCUMENTS

| | | | |
|---|---|---|---|
| 3,800,121 | 3/1974 | Dean et al. | 219/519 |
| 4,029,937 | 6/1977 | Russell | 219/497 |
| 4,093,847 | 6/1978 | Walker et al. | 219/501 |
| 4,350,876 | 9/1982 | Kubota et al. | 219/497 |
| 4,500,775 | 2/1985 | Sango et al. | 219/497 |
| 4,546,238 | 10/1985 | Ahs | 219/497 |
| 4,554,439 | 11/1985 | Cross et al. | 219/497 |
| 4,572,430 | 2/1986 | Takagi et al. | 219/202 |
| 4,633,061 | 12/1986 | Arikawa | 219/202 |

Primary Examiner—M. H. Pascall
Attorney, Agent, or Firm—Watts, Hoffmann, Fisher & Heinke

[57] ABSTRACT

A control for a resistive heating element embedded within a motor vehicle seat. A transistor is biased into conduction to energize the heating element when the temperature of the element is below a threshold that is adjusted by the vehicle operator. A fault sensing system monitors operations of the control and de-energizes the heating element if a fault is sensed.

13 Claims, 3 Drawing Sheets

ELECTRICALLY HEATED SEAT RESISTIVE HEATING ELEMENT ENERGIZATION SYSTEM

This is a continuation of co-pending application Ser. No. 049,618, filed on May 13, 1987, now abandoned.

TECHNICAL FIELD

The present invention relates to a control for energizing a heating element in a motor vehicle seat.

BACKGROUND ART

Electronically energized heated seats are now increasingly available in motor vehicles. The seat warms a motor vehicle operator before the motor vehicle's heating system becomes effective. A typical automobile heating system can take five to ten minutes after the engine begins running before the thermostat opens. A heating element embedded within a seat starts to heat the motorist as soon as current flows through the heating element. A heated seat option may include resistive elements embedded within only the driver seat, or in some instances both the driver and passenger seat.

One control system primarily designed for use in controlling the actuation or energization of a heated seat is disclosed in U.S. Pat. No. 4,546,238 to Ahs. The control system disclosed in this patent utilizes the fact that the resistance of the resistive heating element changes with temperature. By monitoring a voltage signal generated across the resistance element, the temperature of the resistance element is determined. Comparator circuits in the control system energize and de-energize the resistive heating element to maintain the heating element temperature within a control range.

One potential problem that appears to have been overlooked in prior art heated seat systems is protection against electrical short circuits. A short in the control circuit of such a system can overheat the circuit and cause permanent damage. A large overcurrent might even cause the vehicle seat to catch on fire. Over current sensing and transient protection to prevent circuit damage due to high voltage spikes are necessary features in a reliable, safe heated seat system.

DISCLOSURE OF THE INVENTION

It is one object of the invention to provide a reliable, safe, and inexpensive control system for electronically energizing a resistive heating element in a motor vehicle seat.

A heating element control system constructed in accordance with the invention includes an energizing circuit coupled to a motor vehicle ignition switch to couple an energizing voltage across a heating element. A sensor senses the temperature of the heating element and generates a control signal output related to the temperature. A switch coupled to the control signal output controls current through the heating element as a function of the temperature of the heating element. Additionally a failure detection or sensing circuit deenergizes the heating element in the event of a malfunction in the control system.

One malfunction that is sensed is a short circuit resulting in the energization signal from the ignition switch bypassing the heating element. This malfunction will cause the control system to overheat. An additional failure would be a short circuit in the control system so that the ignition signal is applied across the heating element at all times. This malfunction can result in high currents that dissipate excessive heat and may damage or even ignite the vehicle seat. High voltage transients that can exist in a vehicle ignition system disrupt or damage the control system. These transients are sensed and intercepted.

In a preferred embodiment of the invention, the switch element comprises a transistor which is biased on and off in a manner dependent upon the temperature of the resistive heating element. So long as the resistive heating element is below a set point temperature, controlled by the motor vehicle operator, the transistor cycles on and off energizing the heating element. The resistive heating element has a positive co-efficient that causes the heating element resistance to rise as the temperature rises. By monitoring this resistance, a sensing circuit controls the bias on the transistor as the temperature of the heating element rises and falls above and below the set or control temperature. When the heating element is heating up and transmitting energy to the seat in the form of joule heating energy, the transistor is cycled on and off at a frequency controlled by a timing circuit interposed between the transistor and the sensing circuit.

A control module mounted to a vehicle dashboard includes a light for illuminating the control system, a switch for actuation of the control system by the vehicle operator, and a variable control for adjusting a set or control temperature of the heated seat. In addition, light emitting diodes are utilized to apprise the vehicle operator of the status of the control and in particular indicate those intervals in which the resistive heating element is carrying a high current and transmitting heat to the seat.

From the above it is appreciated that one object of the invention is a new and improved control system for energizing a heated seat heating element. This and other objects and advantages of the invention will become better understood from a detailed description of a preferred embodiment of the invention discussed below in conjunction with the accompanying drawings.

BEST MODE FOR CARRYING OUT THE INVENTION

Figure 1:
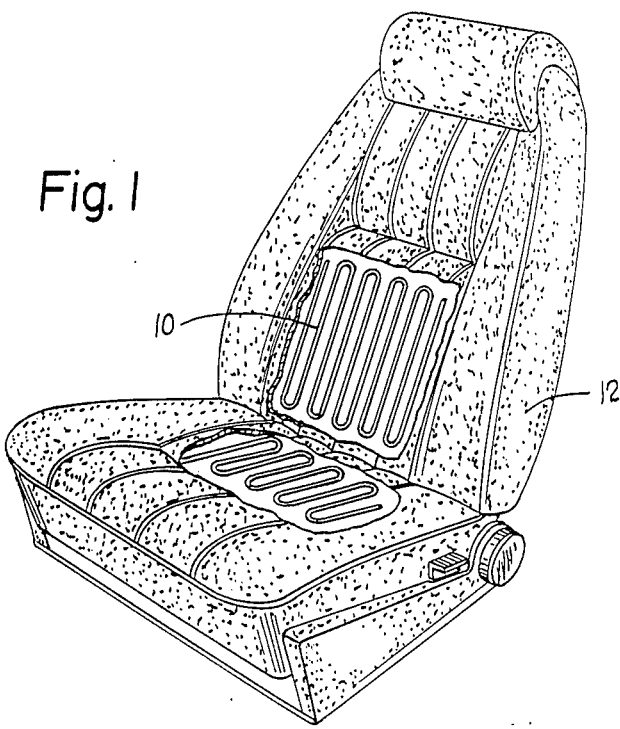
FIG. 1 is a perspective view of a motor vehicle seat having an embedded resistive heating element.

Turning now to the drawings, FIG. 1 shows a automobile seat having a resistive element 10 embedded within the seat 12. During periods of cold weather, the driver may actuate the heated seat to cause current to flow through the resistive element 10 and warm the seat prior to the automobile heater becoming effective.

An energization circuit 20 (FIG. 2) for activating the resistive element 10 includes an energization input 22 shown schematically coupled to the heating element 10. A control module 30 (FIG. 3) is mounted to the motor vehicle dashboard within convenient reach of the motor vehicle operator. Both the energization circuit 20 and the control module 30 are coupled to an ignition switch input 32 that energizes both the circuit 20 and control module 30 whenever the ignition key is switched on. Typically, this ignition input carries a regulated 12 volt signal from the vehicle battery.

The control module 30 includes a combined switch-/potentiometer control unit 34. A switch 34a can be opened and closed by the vehicle operator to activate and deactivate the heated seat option. A variable resistor 34b of the control switch unit 34 allows an adjustment of the heated seat temperature by the adjustment of a resistance. When the ignition signal input 32 is high (+12v), a light bulb 36 coupled across the ignition signal and automobile ground is energized to illuminate the switch 34. When the switch contact 34a is closed, the 12 volt ignition signal at the input 32 is coupled to an output 40 labelled "switch output" in FIG. 3. This switch output is therefore a 12 volt regulated signal which is input to the energization circuit 20 when the switch 34a is closed.

The voltage at the input 40 is coupled across a combination of a resistor and a zener diode 42 having a break down voltage of approximately 16 volts. An output labelled VCC in FIG. 2 therefore follows the switched ignition voltage 40 unless this input exceeds 16 volts at which point the zener diode 42 breaks down and regulates the VCC voltage to 16 volts. The VCC signal is used to energize those remaining components of the energization circuit 20 that require an external power source.

The voltage at the input 40 is also coupled to a diode 44 which prevents negative transients from reaching the circuit 20. Specifically, the diode 44 prevents those transients from reaching two switching transistors 46, 48. The voltage at the input 40 in combination with the biasing resistors coupled to the two transistors 46, 48 turns on the transistor 48 causing current to flow through a relay coil 50 coupled to the collector of the transistor 48. Energization of this coil 50 closes a relay contact 52 and couples the ignition signal input 32 to the resistive element 10. The ignition voltage therefore energizes the heated seat whenever the relay contact 52 is closed.

Figure 2:
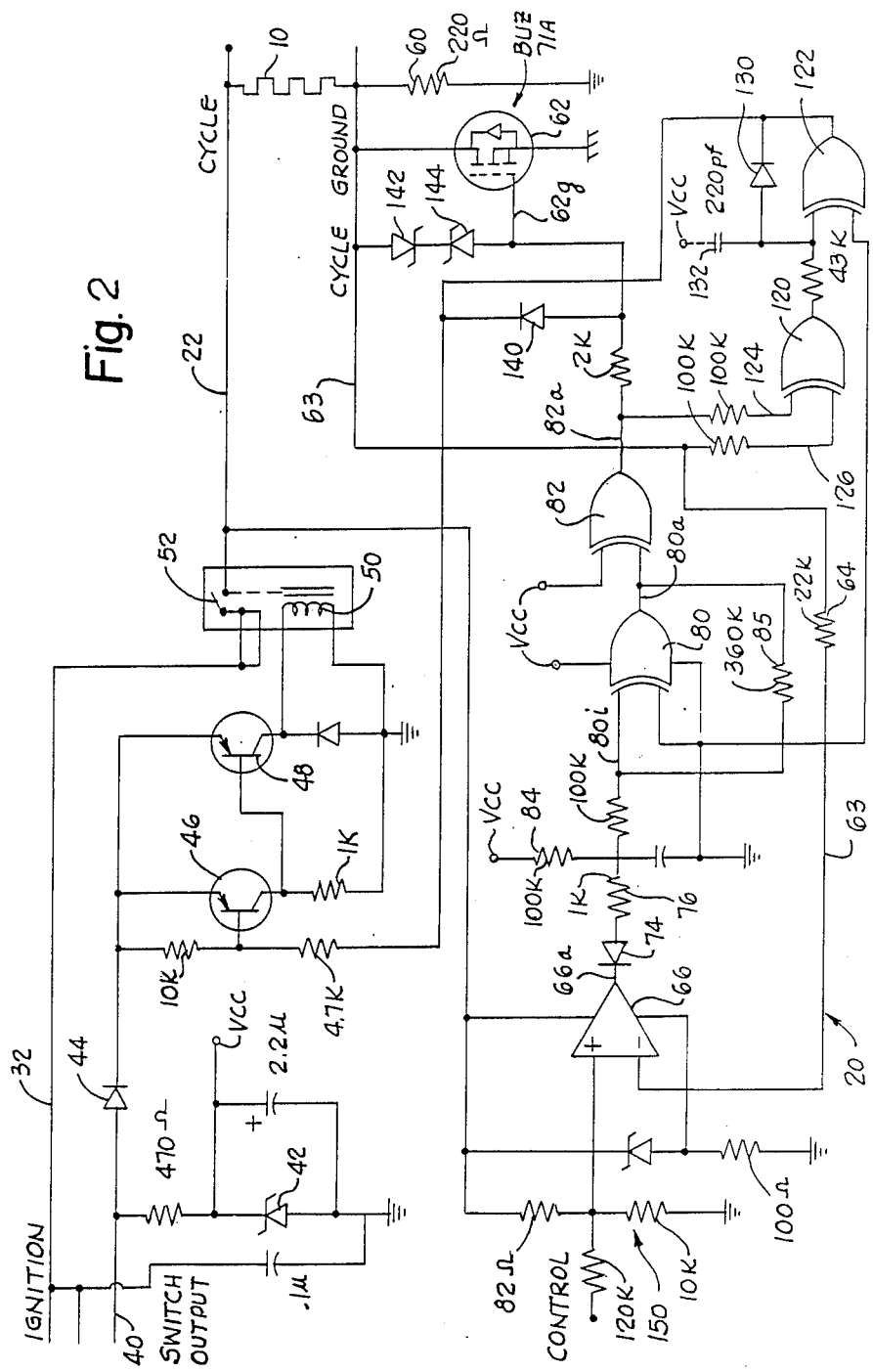

As seen in FIG. 2, a negative side of the resistive heating element 10 is coupled to a 220 ohm resistor 60 and a field effect transistor 62 which together form a parallel path to ground for the energizing signal from the ignition 32. The current through the resistive heating element 10 depends upon the status of the field effect transistor 62. When this transistor is rendered nonconductive, it presents a high impedance path to the ignition voltage and a low level quiescent current through the heating element 10 is produced by the ignition voltage applied across the series combination of the resistive heating element 10 and the resistor 60. When the transistor 62 is rendered conductive, however, the resistor 60 is essentially bypassed and the transistor 62 forms a low resistance path to ground so that current through the heating element 10 increases. Under these circumstances high current passes through the heating element 10 and the seat 12 is heated.

Figure 3:
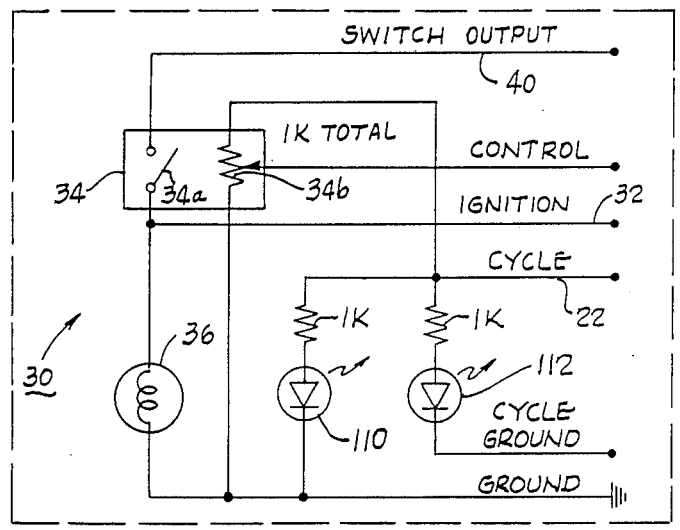
FIGS. 2 and 3 are schematic diagrams of a control system for energizing the resistive heating element of FIG. 1.

A conductor 63 connected at the juncture of the resistive heating element 10 and the resistor 60 is coupled to a comparator amplifier 66 through a resistor 64. An output 66a from the comparator amplifier 66 is high or low depending upon the relative size of the two inputs to the amplifier 66. A second input (at a non-inverting input to the amplifier) labelled CONTROL in FIGS. 2 and 3 is controlled by the variable resistor 34b in the control module 30.

The variable resistor 34b is coupled to the input 22 which is energized by the ignition input 32 whenever the relay contact 52 (FIG. 2) closes. By adjusting the setting of an adjustable control knob coupled to the variable resistor 34b, the motor vehicle operator raises and lowers the CONTROL input voltage to the amplifier 66 and accordingly raises and lowers a reference voltage to control the point at which the output 66a changes state. This knob is labeled with temperature indicators to inform the motor vehicle operator which direction the knob must be turned to raise or lower the seat temperature.

If the temperature of the heating element 10 is below a desired seat temperature when the ignition switch is closed, the voltage input to the amplifier 66 from the negative side of the resistive heating element 10 is higher than the CONTROL input to the comparator amplifier 66. This produces a low signal at the amplifier output 66a which discharges a capacitor 72 through the series combination of a diode 74 and resistor 76. The capacitor 72 discharges with a time constant dependent upon the capacitance of the capacitor 72 and a resistance of the resistor 76.

The voltage on the capacitor 72 is coupled to an input 80i of an exclusive OR gate 80. The output 80a from the gate 80 is coupled to a second exclusive OR gate 82. These gates in combination act as an inverter circuit so that a low signal at the input to the first gate 80 from the capacitor 72 causes a high signal at the output 82a of the second exclusive OR gate 82. The output 82a from the second exclusive OR gate 82 is coupled to a gate input 62g of the field effect transistor 62. A high signal at the gate input 62g turns on the field effect transistor 62 and shorts the resistor 60 to increase the current passing through the heating element 10.

When the transistor 62 is rendered conductive, the voltage at the inverting input to the comparator amplifier drops below the CONTROL input. The output 66a goes high and the capacitor 72 charges through a resistor 84. The capacitor 72 charges at a rate determined by the RC time constant of the resistor 84 and capacitor 72 and is slower than the discharge rate of the capacitor 72.

A feedback resistor 85 connects the gate input 80i to the gate output 80a. The resistor 85 provides hysterisis to the operation of the gate 80. As the capacitor 72 discharges a lower capacitor voltage is needed to cause the gate 80 output to change state than is needed when the capacitor is charging. This is because when the capacitor 72 discharges, the resistor 85 tends to pull up the voltage on the input 80i and when the capacitor 72 is charging the resistor 85 tends to diminish the voltage at the input 80i. The crossover voltage of the gate input 80i is typically approximately VCC $\div 2$. As the capacitor 72 charges, it must charge to a value of (VCC $\div 2$) +10% to bring the input 80i to VCC $\div 2$. As the capacitor 72 discharges, it must discharge to a value of (VCC $\div 2$) −10% to drop the input 80i to VCC $\div 2$.

As the transistor 62 cycles on and off the heating element 10 heats up and due to its positive coefficient of resistance, the voltage across the resistance element 10 drops. As the element's resistance drops the voltage at the junction between the heating element 10 and resistor 60 drops below the reference or CONTROL input to the amplifier 66 with the transistor 62 non-conductive and the amplifier output 66a remains high. This maintains the charge on the capacitor 72 so that the inverter formed from the combination of the two exclusive OR gates 80, 82 keeps the transistor 62 turned off.

The quiescent or low level current through the heating element 10 is defined by the voltage across the heating element 10 and series connected resistor 60. The motor vehicle operator can open the switch 34a once the seat has been heated to remove even this low level current from the resistive heating element 10 but the heating affects with the switch 34a closed are minimal.

Returning to FIG. 3, two light emitting diodes 110, 112 indicate the operating condition of the energization circuit 20. A first light emitting diode 110 is coupled across the output from the relay switch 52 to indicate when the resistive element 10 is energized. A second light emitting diode 112 is coupled in parallel to the resistive heating element 10 and is forward biased to emit light only when the transistor 62 conducts. Stated another way, when the transistor 62 is not conducting, the voltage drop across the resistive heating element is too small to cause this second light emitting diode 112 to emit light.

Two additional exclusive OR gates 120, 122 (FIG. 2) check for a short circuit condition of either the transistor 62 or the heating element 10. The exclusive OR gate 120 has two inputs 124, 126. One input 124 is coupled to the gate input 62g of the transistor 62 through a resistor 128. A second input 126 is coupled to the junction between the heating element 10 and the resistor 60. In the event of a short circuit of the transistor 62 both inputs 124, 126 go low. This forces the output of the exclusive OR gate 120 low which also forces the output from the exclusive OR gate 122 low. The gate 122 in combination with a diode 130 and capacitor 132 latch the output signal from the gate 120. The output from the gate 122 is coupled to the base input of the transistor 46. A low signal at the base of the transistor 46 turns that transistor on, raising the voltage at that transistor's collector, causing a base input to the transistor 48 to turn off the second transistor 48. With the transistor 48 in a off state, the relay coil 50 is de-energized and the normally opened relay contact 52 opens.

A short circuit across the heating element 10 is also sensed and used to open the relay contact 52. A short across the heating element 10 at a time when the field effect transistor 62 is on means both inputs 124, 126 to the exclusive OR gate 120 are high. The output from the gate 120 then goes low as does the output from the gate 122. This turns on the transistor 46 to bias the transistor 48 off and open the relay contact 52.

Note that a low output from the gate 122 not only de-energizes the heating element 10 but turns off the transistor 62 by grounding the gate input 62g through a diode 140.

The short circuit protection prevents high, potentially dangerous currents from developing in the heating element 10. These high currents could potentially damage the circuit 20 and could also cause the seat 12 to catch on fire.

Two zener diodes 142, 144 are series coupled across the gate input 62g of the transistor 62 and the juncture of the heating element 10 and resistor 60. The diode 142 limits the voltage across the gate of the transistor 62 to 7.5 volts. Transient protection for the transistor 62 is provided by the diode 144 which has a breakdown voltage of 47 volts.

Figure 4:
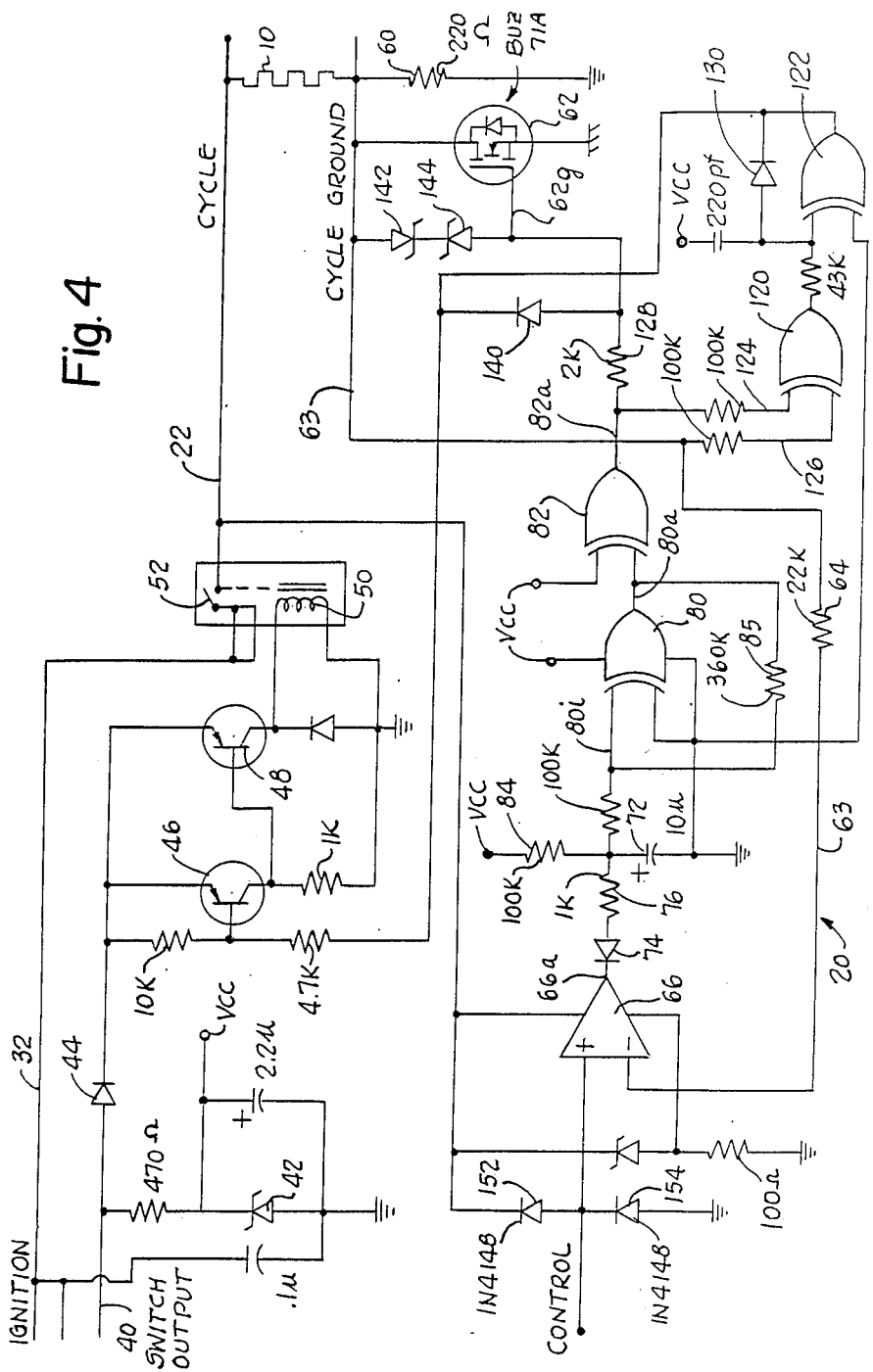
FIG. 4 depicts an alternate control system schematic.

The comparator amplifier 66 is protected against transients by a resistor network 150 coupled to the non-inverting comparator input. The network 150 allows the voltage output from the variable resistor 34b to control the input to the comparator while preventing transients from reaching the comparator amplifier 66. An alternate transient suppression circuit is illustrated in FIG. 4. In the alternate circuit the resistor network 150 (FIG. 2) is replaced with two diodes 152, 154 which block transients from reaching the comparator amplifier.

In operation, the status of the gate input 62g determines whether the heating element 10 carries a high level or quiescent current. The gate input 62g is in turn controlled by the voltage across the resistor 60 which as noted previously depends on the resistance and therefore temperature of the heating element 10. The transistor 62 cycles on and off at a rate controlled by the RC time constant of the capacitor 72 and resistor 84 until the heating element 10 reaches a reference temperature controlled by the operator adjusted CONTROL input to the comparator 66. When this occurs the transistor 62 is turned off until the heating element temperature again falls below the reference.

The present invention has been described with a degree of particularity. It is the intent, however, that the invention include all modifications and alterations of the disclosed design falling within the spirit or scope of the appended claims.

I claim:

1. A method for energization a resistive heating element embedded within a motor vehicle seat comprising the steps of:
    closing a user actuated switch to apply a direct current, vehicle battery energization voltage to an energization switch coupled across a heating circuit comprising a resistive heating element and a switching device for controlling current flow through the resistive heating element;
    sensing the temperature of the resistive heating element and generating a sensed signal related to the temperature of the resistive heating element;
    generating a control signal related to a motorist control input corresponding to a desired temperature of said motor vehicle seat;
    comparing the control signal with the sensed signal and if the comparison indicates the temperature of the resistive heating element should be increased to cause the motor vehicle seat to reach the desired temperature, increasing current through the heating element by activating the switching device to increase current flow through the resistive heating element until the temperature of the motor vehicle seat reaches the desired temperature as indicated by the sensed signal;
    monitoring a fault signal at a junction coupled to the heating circuit; and
    if the fault signal indicates a dangerous rise in the current through the heating circuit indicating a short across either the resistive heating element or the switching device, opening the energization switch to remove the direct current vehicle battery energization voltage from the heating circuit until the user again actuates the user actuated switch.

2. The method of claim 1 wherein the step of applying a direct current energization signal is accomplished by closing a relay contact when the user actuated switch is closed and wherein said relay contact is opened if a short is sensed in the heating circuit.

3. The method of claim 1, additionally comprising the step of providing a visual indication to the motorist concerning the status of the energization switch through which battery energization voltage is coupled to the heating element.

4. The method of claim 3 where a second visual indication is provided to the motorist as the switching device is periodically rendered conductive to heat the resistive heating element.

5. A heated seat control for energizing a resistive heating element embedded within a vehicle seat comprising:
   (a) an energization circuit coupled to an ignition signal of a vehicle, said energization circuit including a user actuated switch for activating heating of the seat, a relay coil, relay contact, energizing transistor responsive to a signal from the user actuated switch for energizing the relay coil to couple the ignition signal to the resistive heating element through the relay coil,
   (b) a heating circuit coupled to the energization circuit and comprising a series combination of
      (i) the resistive heating element and
      (ii) a switching transistor for regulating current through the heating element;
   (c) temperature control means including adjustment means for generating a reference signal corresponding to a desired seat temperature and a comparator circuit for comparing a temperature signal that varies as the temperature of the heating element changes with the operator adjusted reference signal and for providing a control output for activating the switching transistor to increase current through the heating element if a sensed temperature of the heating element is less than a control temperature corresponding to the operator adjusted reference signal;
   said switching transistor having a control input coupled to a control output from the comparator to increase current passing through the heating element and raise the temperature of the heating element; and
   (d) fault sensing logic circuitry coupled to the heating circuit to monitor a signal corresponding to current passing through the heating circuit, said fault sensing logic circuitry generating a logic output to control said energizing transistor to open the relay contact and deenergize the heating circuit in the event sensed currents in the heating circuit indicate a fault condition and for maintaining the relay contact in the open state until the user again actuates the user actuated switch.

6. The apparatus of claim 5 additionally comprising delay means coupled between the output from the comparator circuit and the switching transistor for imposing a time delay between a change in the control signal from said comparator and receipt of the change in the control signal output by the switching transistor.

7. The apparatus of claim 5 additionally comprising means for suppressing spurious transient signals originating at the energization circuit from reaching the temperature control means, the switching transistor, and the fault sensing logic circuitry.

8. The heated seat control of claim 5 wherein the fault sensing logic circuitry comprises a logic gate with first and second inputs, said first input electrically coupled to the control input of said switching transistor and said second input coupled to said heating element, said logic gate producing a fault signal at said logic output when the two inputs are both above or both below a logic gate threshold level.

9. A heated seat control for energizing a resistive heating element embedded within a motor vehicle seat comprising:
   (a) an energization circuit coupled to a direct current signal from the motor vehicle, said energization circuit including a user actuated switch for activating heating of the seat, an energization switch responsive to an output of the user actuated switch for transmitting the direct current signal, and a heating circuit electrically connected to the energization switch comprising a series combination of the heating element and a current control switch;
   (b) a temperature control for generating a reference signal corresponding to a desired heated seat temperature;
   (c) temperature sensing means including a comparator circuit having an input for comparing a temperature signal indicating a temperature of the motor vehicle seat with an operator adjusted reference signal and generating a control output when the temperature signal indicates the motor vehicle seat temperature is less than a temperature corresponding to the operator adjusted reference signal;
   said current control switch having a control input coupled to an output from the comparator to increase current passing through the heating element when said control switch is closed in response to said control output to raise the temperature of the heating element; and
   (d) fault sensing logic circuitry coupled to the heating circuit to monitor a condition of the heating circuit, said fault sensing logic circuitry having a logic output for opening the energization switch and removing the direct current signal from across the heating circuit in the event a short-circuit condition across either the control switch or the heating element is sensed and maintaining the energization switch in an open condition until the user again operates the user actuated switch.

10. The heated seat control of claim 9 wherein the temperature control is mounted to the vehicle within view of the operator for generating a reference signal to the comparator related to a desired vehicle seat temperature and further including means for generating a visible indication when said switch couples the direct current signal to the combination of the heating element and said resistive current limiting element.

11. The apparatus of claim 10 wherein the control means further comprises a second visible indicator means for generating a visible indication when said switching transistor is turned on to increase current passing through the heating element.

12. The apparatus of claim 9 wherein the fault sensing logic circuitry has a first input electrically coupled to the control input of said switching transistor and has a second input electrically coupled the heating element, said fault sensing logic circuitry configured to produce a control output to the energizing transistor when both said first and second input have the same logic state.

13. The apparatus of claim 9 wherein a delay means is interposed between an output from the comparator and the control input of the current control switch to assure the current control switch increases current through the heating element for a delay period while the comparator senses the temperature signal corresponding to the temperature of the motor vehicle seat.

* * * * *